Patented May 19, 1953

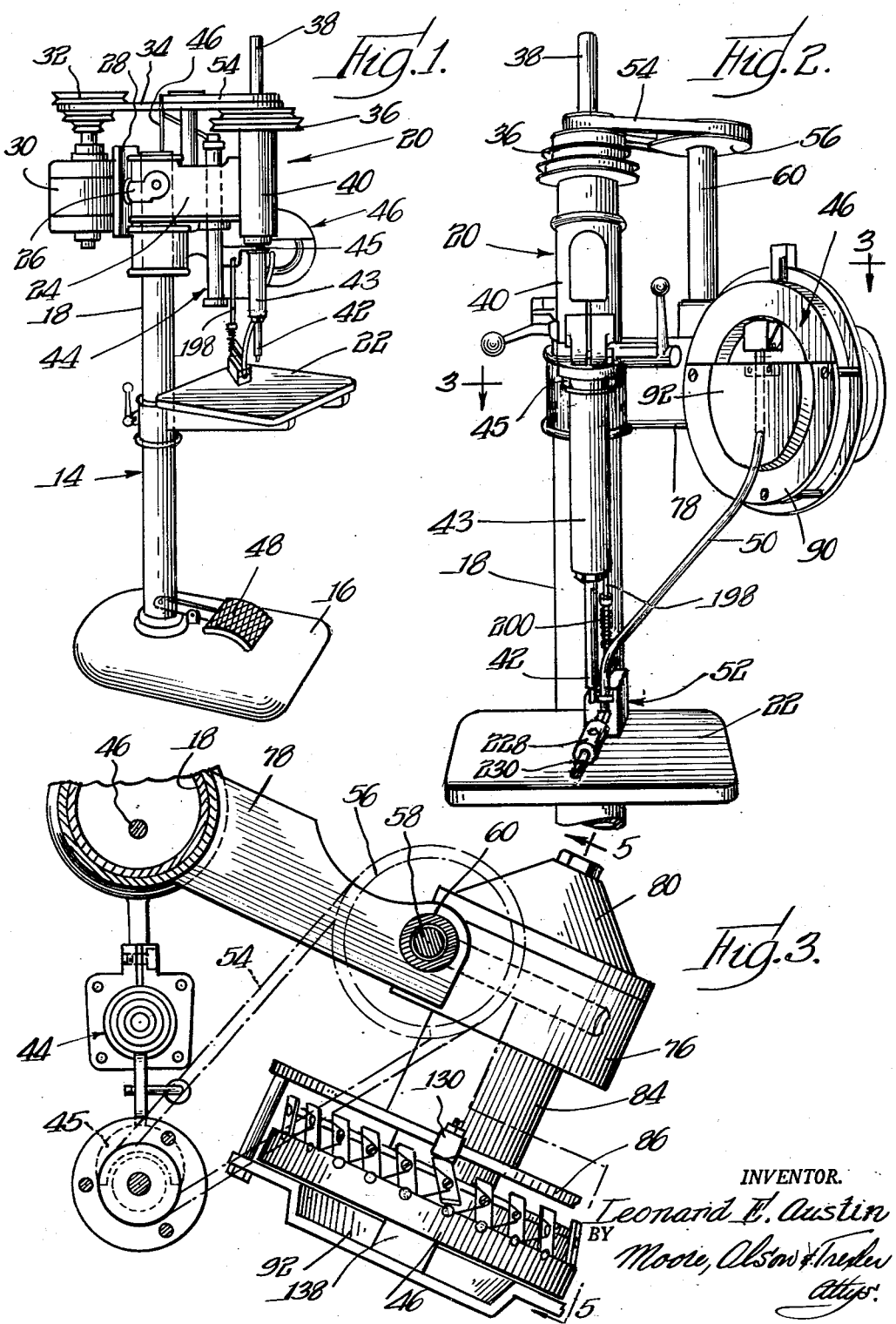

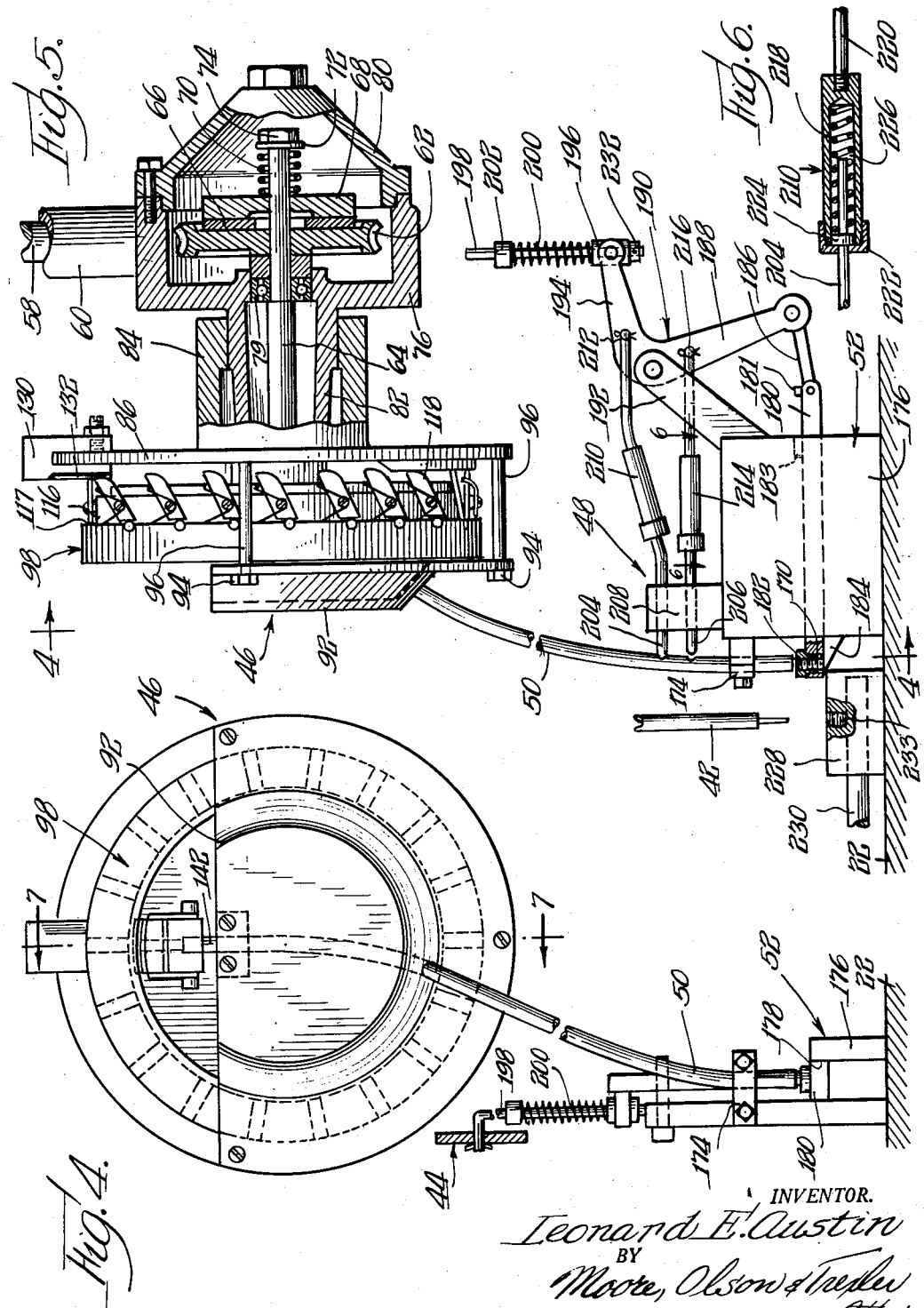

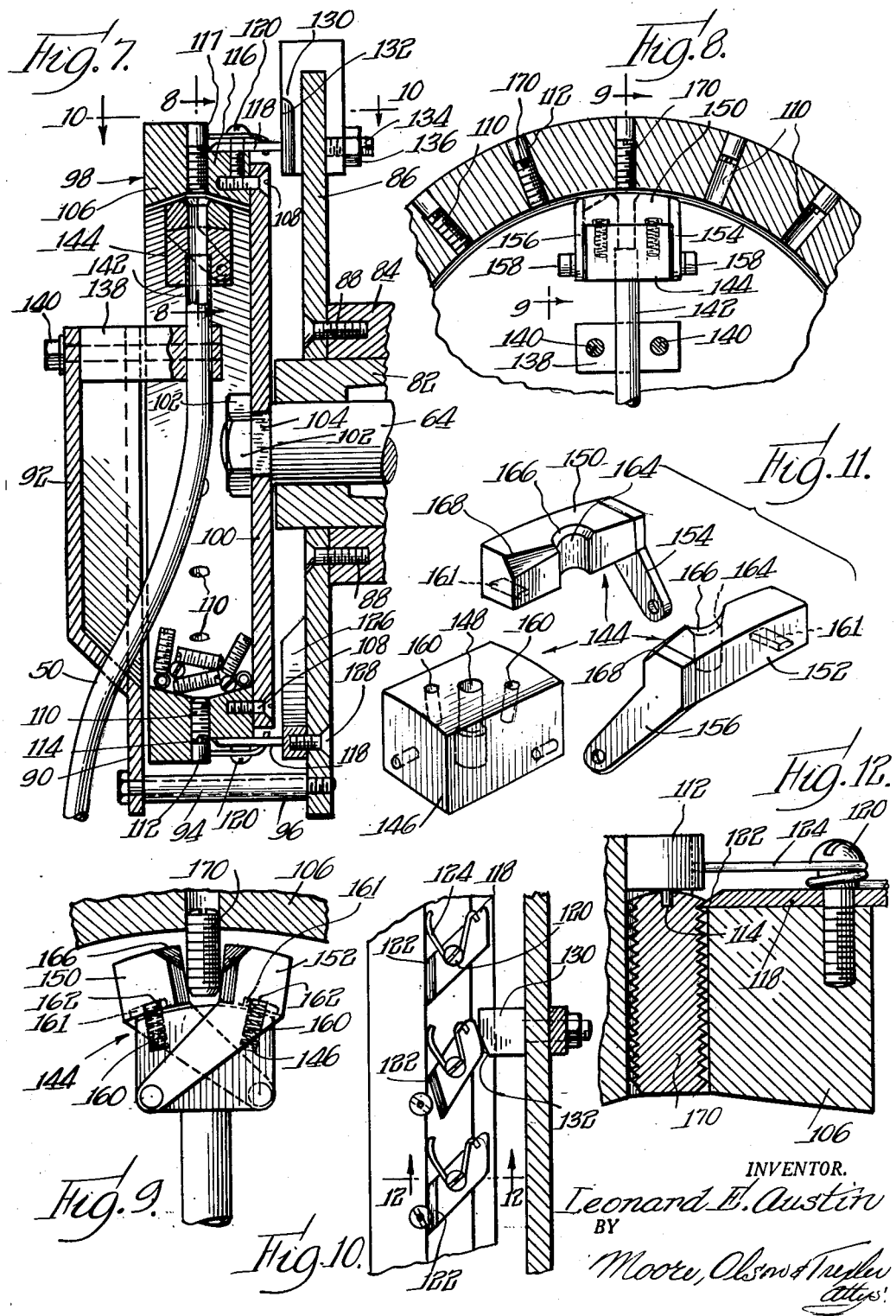

2,638,945

UNITED STATES PATENT OFFICE 2,638,945

MACHINE FOR ORIENTING AND DRIVING LONGITUDINALLY ASYMMETRICAL HEADLESS FASTENERS

Leonard Edmond Austin, Chicago, Ill., assignor to Illinois Tool Works, Chicago, Ill., a corporation of Illinois Application November 12, 1949, Serial No. 126,883

17 Claims. (Cl. 144—32)

This invention relates to means for automatically feeding screws, pins or other studs, and more particularly relates to such means that are adapted to feed headless screws for use with a conventional drill press type of screw driver.

Many mechanisms for automatically feeding studs to a power driver rely upon the difference in radii between the heads and shanks of the studs to properly orient the studs. Often it is desired to utilize headless screws, which well illustrate the studs my feeding means are to handle, so that it is unnecessary to countersink the screw hole to have the screw set flush with or below the surface of the object into which it is threaded. Such screws may be provided with cross slots or other types of sockets for driving them, but having no heads with diameters greater than the shanks, such screws present many problems as to their orientation in an automatic delivery mechanism. It is apparent that if a screw were to be delivered upside down to a work piece it would not enter the aperture into which it is to be threaded in the manner desired and no slot or other socket would be presented to the driving member.

It is an object of the present invention to provide a hopper and orienting and delivery means for automatically feeding headless studs to a power driver.

An ancillary object of this invention is to provide means for automatically orienting headless studs.

A more particular object of this invention is to provide means for feeding headless studs and more particularly to provide means for orienting headless studs which will retain oriented studs and release those which are not oriented.

An ancillary object is the provision of a plurality of edged elements engageable with the threads of properly oriented screws or with necks of reduced diameter of other headless studs to retain them during orientation.

A further object is the provision of a hopper containing a rotary drum having a V-shaped inner surface, said drum being provided with radial apertures extending outwardly from the central plane of said V-shaped inner surface for receiving headless studs longitudinally disposed radially of said drum.

Another object of this invention is the provision of delivery means for properly aligned studs, said delivery means including safety release means for preventing damage by improperly aligned studs.

Yet another object of the present invention is the provision of mechanism for receiving studs from said foregoing delivery means and shifting said studs into driving position.

Other and further objects and advantages of the present invention will be apparent from the following description when taken in conjunction with the accompanying drawings in which:

Figure 1 is a perspective view of a power screw driver embodying the invention.

Fig. 2 is a fragmentary view in front elevation of the power screw driver of Fig. 1.

Fig. 3 is an enlarged view in horizontal section taken substantially along the line 3—3 of Fig. 2.

Fig. 4 is a fragmentary view taken along the line 4—4 of Fig. 5.

Fig. 5 is a view partly in section taken along the line 5—5 of Fig. 3.

Fig. 6 is a sectional view taken along the line 6—6 of Fig. 5.

Fig. 7 is an enlarged sectional view of the hopper along the line 7—7 of Fig. 4.

Fig. 8 is an enlarged fragmentary sectional view along the line 8—8 of Fig. 7.

Fig. 9 is an enlarged view partially in section along the line 9—9 of Fig. 8.

Fig. 10 is a view partially in section along the line 10—10 of Fig. 7.

Fig. 11 is an exploded perspective view of the screw receiving mechanism shown in Fig. 9.

Fig. 12 is an enlarged sectional view along the line 12—12 of Fig. 10.

As shown in the drawings, a power screw driver which forms one embodiment of the present invention comprises a standard drill press 14 (Fig. 1) to which is attached a plurality of additional and substitute or auxiliary mechanisms by which the drill press is adapted for use as a hopper fed power driven screw driver for driving headless screws. The drill press 14 comprises a main base or stand 16 on which is mounted a hollow supporting column or post 18 carrying at its upper end a vertically adjustable head unit 20 spaced above a vertically adjustable work table 22. The head unit 20 includes the usual mounting frame 24 secured in adjustable position by conventional means which form no part of this invention.

The frame 24 is provided with supports 26, only one of which is shown in the drawings, for securing the motor mounting plate 28 to which is secured the usual drive motor 30, the shaft of which projects upwardly and carries at its upper end a pulley 32 which conveniently may be a four-step pulley driving a belt 34 passing over a four-step pulley 36 to drive the usual spindle 38 which is free to reciprocate vertically through the pulley. The spindle 38 may be provided with the usual clutch mechanism and may be journaled for reciprocation in the usual manner in a sleeve and a vertically reciprocable quill or tube 43 in a tubular front section 40 of the head frame 24, all as disclosed in my copending application, Serial No. 65,277, filed December 14, 1948, and titled "Power Screw Driver." The spindle preferably carries a socket or other tool engaging structure at its lower end wherein is secured a driving member 42 which for illustrative purposes is shown as a screw driver blade for engaging a slotted screw. A reciprocating mechanism generally designated as 44 and provided with a connection 45 encircling the spindle and secured to the vertically reciprocable quill is provided to shift the spindle and driving member vertically. The reciprocating mechanism may comprise a fluid actuator or motor and may be similar to the quill actuator 64 disclosed in my copending application referred to above. Reciprocation of the mechanism 44 is controlled by means of linkage 46 actuated by a foot pedal 48.

*The hopper and screw orienting mechanism*

The additional and substitute or auxiliary mechanism or means comprises screw feeding means including a screw feeding hopper 46 (Figs. 2 and 5), an escapement or screw feeding control device 48 operating in conjunction with a screw delivery tube 50, and a screw locating mechanism 52. Driving power is provided for the hopper by a belt 54 engaging the pulley 36 and driving a pulley 56 on a shaft 58 mounted within a hollow post 60. A worm gear 62 cooperating with a worm on the lower end of the shaft 58 is loosely mounted on the hopper driving shaft 64 and a friction clutch ring 66 is secured thereto. A driving disk 68 is splined to the shaft 64 for rotation therewith and for axial movement relative thereto. A coil spring 70 encircling the shaft 64 is interposed between the driving disk 68 and a washer 72 bearing against a nut 74 threaded on the end of the shaft 64. It will be evident that the coil spring 70 maintains the driving disk 68 in driving engagement with the friction clutch ring 66 which rotates with the worm gear 62, but the spring permits outward axial movement of the driving disk 68 to disconnect the shaft from the worm gear to prevent damage in case of a jam within the hopper and orienting mechanism presently to be described. The gearing and clutch mechanism are housed within a casting 76 having an extending arm 78 (Fig. 2) secured to the supporting column or post 14 by any desirable means. The shaft 64 may be journaled in a suitable antifriction bearing 79 secured in the housing. A cover 80 is bolted to the casting 76 to completely enclose the gearing and clutch.

A sleeve 82 extends horizontally from the casting 76 and encircles the shaft 64. A collar 84 is secured over the sleeve 82 by cooperating threads, screws or any other desirable means, and to this collar is secured a circular hopper support plate 86 by means such as screws 88 (Fig. 7). An outer plate or cover 90 having a scoop or screw feed trough 92 is secured to the support plate 86 by bolts 94 encircled by spacers 96.

Between the support plate 86 and the cover 90 is situated an open-ended drum 98 secured to the end of the shaft 64 for rotation therewith. The drum 98 comprises a circular plate 100 held on the shaft 64 by a nut 102 threaded on an extending portion 104 of reduced diameter of the shaft 64. To ensure rotation of the drum, the extending portion 104 may be provided adjacent the main portion of the shaft with a non-circular cross-section cooperating with a similarly shaped aperture in the plate 100. A circular rim 106 is secured to the periphery of the plate 100 as by screws 108. The inner surface of the rim 106 is substantially V-shaped in cross-section to present screws to the central plane thereof in such position that they may enter radial apertures 110 with either the slotted end or the non-slotted end directed toward the center of the drum. The diameter of each of the apertures 110 is sufficiently larger than the diameter of the screws to allow ready entry thereof, and the recesses may be tapered or flared outwardly at the inwardly directed ends further to facilitate such entry.

The outer end of each aperture is provided with a plug 112 having a radially inwardly directed finger 114 of sufficiently small diameter to fit within the cross slot of a headless screw fed by the mechanism. The periphery of the rim 106 has two different diameters with the portion 116 of lesser diameter being toward the shaft 64 and providing a shoulder 117 adjacent the apertures 110 and plugs 112. Peripherally spaced about the portion 116 of lesser diameter are a plurality of screw-securing or retaining elements 118 pivotally secured as by screws 120. Edges of the screw-retaining elements 118 extend partially within the apertures 110 and are provided with knife edges 122, as may best be seen in Figs. 10 and 12, for small screws. For screws having coarser threads, the edges need not be so sharp. Bias is provided by springs 124 looped about the screws 120 and abutting the shoulder 117 and engaging the elements 118 to maintain the knife edges 122 normally within the apertures 110. A cam 126 which may have an arcuate extent of approximately forty-five degrees is secured to the supporting plate 86 near the bottom thereof as by screws 128 to abut against the elements 118 to cause said elements to pivot about the mounting screws 120 against the action of the biasing springs 124 to remove the knife edges 122 from the apertures 110, throughout the period when screws tumbled in the rotary drum 98 may enter the apertures 110 by the action of gravity. A cam 130 overlies the plate 86 at the top thereof and has a camming surface 132 engageable with the screw securing elements 118. This cam may have an arcuate extent of only a few degrees and may be secured in place by a set screw 134 and locking nut 136. It should be noted that the shapes of the camming surface 132 and the butt ends of the elements 118 are such as to ensure rapid pivotal movement of the elements.

A supporting member 138 is secured to the trough 92 of the cover 90 by means such as a bolt 140 to secure the top end 142 of the screw delivery tube 50 which in turn supports a screw receiving mechanism 144 in alignment with the apertures 110. With reference to Fig. 8 it may be seen that a screw extending inwardly from an aperture 110 would strike the screw receiving mechanism 144 and would cause the mechanism to jam were not some provision made for such an eventuality. To preclude a jam under such circumstances, the screw-receiving mechanism 144 is constructed as may be seen best in Figs. 9 and 11 in a plurality of parts. The base 146 comprises a substantially solid block which is vertically centrally apertured at 148 to receive the upper end 142 of the screw delivery tube 50 and screws released from the apertures 110. A pair of guide members 150 and 152 are pivotally secured to the base 146 and supported thereabove by depending arms 154 and 156 respectively. The arms may be formed integral with the guide members if desired. The arms 154 and 156 are apertured adjacent their lower ends and are pivotally secured to the base 146 by screws or bolts 158 threaded into the base. The top of the base 146 is formed as an arc of a circle as may be seen in Fig. 9, as are the top and bottom surfaces of the guides 150 and 152. Cooperating apertures 160 and 161 are provided in the base 146 and in the guides 150 and 152 for receiving coil springs 162 normally to bias the guides 150 and 152 into engagement with one another. The engaging surfaces of the guides are each slotted in the shape of a semicircle as at 164 to provide a bore leading into the bore 148 of the base 146. A beveled portion 166 is provided adjacent the upper surface of the guides and leading into the semicircular portions 164 in order best to receive screws from the drum 98. The upper and facing surfaces of each guide 150 and 152 are cut away at an angle to provide cam surfaces 168 leading into the bore formed by the semicircular portions 164.

*Operation of the hopper and associated screw orienting mechanism*

A plurality of headless screws 170 may be dumped into the hopper through the trough 92. The drum 98 is rotated by the shaft 64 and due to the V-shape of the inner surface of the drum, screw elements tend to fall into the apertures 110 under the force of gravity. The diameter of the apertures 110 as noted heretofore is sufficiently greater than that of the screws 170 to allow ready entry of the screws into the apertures with either end of the screws down. The apertures further may be tapered or flared outwardly at the inner ends to facilitate movement of the screws thereinto which also has been pointed out heretofore. As the knife edges 122 of the screw retaining elements 118 in the lower portion of the drum have been removed from the apertures 110 by the action of the cam 126, the knife edges will not interfere with screws falling into the apertures 110. If a screw falls into an aperture with the slotted end down the pin or finger 114 will enter the slot and the screw will abut against the plug 112. When each screw retaining element 118 leaves the cam 126 it will be pivoted into its normal position by its associated spring 124 and the knife edge 122 will engage the threads of the screw to secure the screw when it is inverted by the rotation of the drum, as shown in Fig. 12. If a screw enters an aperture 110 with the slotted end up, the screw will rest on top of the pin or finger 114 and the knife edge will not engage the threads of the screw but will clear the screw entirely so that the screw will be dumped from the rim 106 of the drum before the screw reaches a vertical position. It should be understood at this point that the invention is not limited to operation on headless screws, but is also operable on other types of longitudinally asymmetric studs having different contours in or at their ends or removed somewhat therefrom along their shanks.

When an oriented screw 170 reaches a vertical position due to the rotation of the drum, the knife edge 122 will be removed from the threads of the screw by the action of the camming surface 132 striking the screw securing element 118 so that the screw 170 may drop from the position shown in Fig. 8 down through the screw receiving mechanism 144 into the upper end 142 of the screw delivery tube 50. If for any reason a screw should be caught extending inwardly from the rim 106 it will not cause any damage but will engage the camming surfaces 168 of the guides 150, 152 to spread said guides and let the screw pass through the receiving mechanism with no damage.

*The remainder of the screw delivery mechanism*

The lower end of the screw delivery tube 50 is positioned adjacent the screw locating mechanism 52 and secured thereto by a holding member 174. The placement mechanism comprises a stationary base 176 which may be secured to the work table 22. The base 176 has a slot 178 in which a slide block 180 is reciprocably mounted. The slide block is provided at the end beneath the screw delivery tube 50 with a vertical aperture 182 to receive screws from the delivery tube and at the other end with a lug 181 cooperable with an adjustable shoulder 183 carried by the base 176. A wedge-shaped supporting element 184 may underlie the bore or aperture 182 to support screws within the aperture, and other means such as a spring pressed pin or ball might be located within the aperture to engage the screw and hold it in position if desired. To the other end of the slide block 180 is pivotally secured a link 186 which is pivotally secured to the lower arm 188 of a bell crank lever 190. The bell crank lever is pivotally mounted on an arm 192 extending upwardly and rearwardly from the base 176. The upper arm 194 of the bell crank lever is pivotally secured to a block 196 through which an actuating arm 198 extends downwardly. A coil spring 200 encircles the arm 198 and abuts the block 196 and a collar 202 secured to the arm 198. The arm 198, as may be seen in Figs. 1 and 2, is secured to part of the vertically reciprocable mechanism 44.

The escapement mechanism 48 includes a pair of horizontal pins 204 and 206 vertically displaced from one another and slidably mounted in a guide 208. The free ends of the pins 204 and 206 alternately enter apertures in the screw delivery tube 50 to drop the screws one-by-one. The opposite extremity of the arm 204 is connected through a link 210 to a pivot 212 on the upper arm 194 of the bell crank lever slightly above its mounting pivot. The pin 206 is similarly connected through a link 214 to a pivot 216 on the lower arm 188 of the bell crank lever slightly below the mounting pivot. The link 210 is shown in Fig. 6 and it is to be understood that the link 214 is similar thereto. The link comprises a cylinder 218 having a connecting rod 220 threaded into one end of it. The other end of the cylinder is closed by a cap 222 threaded onto the end and the pin 204 extends through an axial aperture in this cap. A collar 224 is secured to the pin 204 within the cylinder 218 to prevent axial separation and a compression spring 226 is carried within the cylinder and abutting against the collar to resist relative axial motion of the pin and cylinder toward one another.

*Operation of the screw placement mechanism*

The operation of the screw placement mechanism may be understood most readily with reference to Fig. 5 wherein the apparatus is shown in conjunction with a sleeve 228 to be secured on a rod 230 by a set screw threaded into the aperture 232. With the parts in the position shown in Fig. 5 it may be assumed that the apparatus has been in operation long enough that a screw is in the aperture 182 in the slide block 180. The column of screws within the screw delivery tube 50 is supported by the pin 204. As the vertically reciprocatory mechanism 44 is lowered to move the screw driver 42 into operative position, the rod 128 descends to pivot the bell crank lever and move the slide block 180 to the left. The end of the screw 178 may drop off the support 184 and ride along the surface of the cylinder 226 until it encounters the aperture 232, or the screw may be supported within the aperture 182 as heretofore noted until forced down by the blade of the screw driver 42. The slide block 180 will reach its proper delivery position prior to the finish of the downward movement of the screw driver 42 and reciprocatory mechanism 44 and be stopped by the cooperating lug and shoulder 181 and 183, respectively. The spring 200 compresses to compensate for this. As the bell crank lever 199 is pivoted the pin 204 of the escapement mechanism is retracted from the tube 50 to allow the column of screws within the screw delivery tube 50 to drop downwardly where they are caught and supported by the pin 206 which has been advanced into the screw delivery tube. After the screw has been driven into its desired position the reciprocatory mechanism 44 and screw driver 42 are raised from their driving position and this raises the arm 198. It is to be understood that a stop 233 such as a pin or nut (see Fig. 5) is provided so that the arm 198 will not withdraw from the block 186 but will cause the bell crank lever to pivot in a counterclockwise direction. This slides the slide block 180 into the screw receiving position shown in Fig. 5 and retracts the pin 206 so that a screw may be dropped into the aperture 182. The re-entry of the pin 204 into the screw delivery tube 50 causes the pin to re-engage and support the column of screws within the tube. The coil spring 200 and associated structure, as well as the links 210 and 214, prevent damage to the mechanism in the event of jamming, and additionally provide for a certain amount of lost motion so that, as heretofore noted, the slide block 180 may come to rest before the cessation of vertical movement of the screw driver 42, and additionally so that one of the pins 204, 206 may engage the column of screws before the other disengages the column to ensure the proper dropping of screws.

It will be seen from the foregoing description that I have herein presented means for use in conjunction with a power driven screw driver to deliver headless screws to be driven by said screw driver. Said means will deliver screws only in upright driving position and incorporate various safety mechanisms for preventing damage should any of the mechanism be jammed as by improperly positioned screws.

Although a particular embodiment of this invention has been shown and described, it is to be understood that this is for illustrative purposes only and that changes may be made in the form, construction and arrangement of the parts without sacrificing any of its advantages, and the right is hereby reserved to make all such changes as fairly fall within the spirit and scope of the appended claims.

The invention is hereby claimed as follows:

1. In a mechanism for feeding longitudinally asymmetrical stud means, rotatable hopper means for receiving a mass of heterogeneously positioned longitudinally asymmetrical stud means, means for aligning said stud means in oriented and in unoriented positions, means for determining the longitudinal position of the aligned stud means according to their longitudinal asymmetry, means for engaging and retaining those of said stud means which are in one longitudinal position, means for rotating said hopper means at a continuous uniform rate, and means for operating said engaging means in timed relation to the rotation of said hopper means.

2. In a mechanism for feeding longitudinally asymmetrical stud means, hopper means including a rotatable drum for receiving a mass of heterogeneously positioned longitudinally asymmetrical stud means, said drum having a plurality of inwardly opening holes closed at the periphery of said drum for aligning said stud means in oriented and in unoriented positions, means for determining the longitudinal position of the aligned stud means according to their longitudinal asymmetry, means for rotating said drum to move said aligned stud means, and means for engaging and retaining those of said stud means in one longitudinal position whereby to deliver all of said stud means in said one position to a delivery station while preventing delivery of all of said stud means in another position.

3. In a mechanism for feeding longitudinally asymmetrical stud means, hopper means for receiving a mass of heterogeneously positioned longitudinally asymmetrical stud means, means for aligning said stud means in oriented and in unoriented positions, means for determining the relative longitudinal positioning of oriented and unoriented aligned stud means differently, means for engaging and retaining those of said stud means in one of said aligned positions while not retaining those in the other of said aligned positions whereby to deliver those in one of said aligned positions to a predetermined station, and positive means for disengaging said engaging and retaining means to release the stud means in said one position at said station.

4. In a mechanism for feeding elongated longitudinally asymmetrical stud means, hopper means for receiving a mass of heterogeneously positioned longitudinally asymmetrical stud means, means for aligning said elongated stud means in oriented and in unoriented positions, said last-named means comprising a radially apertured rotary drum, means for engaging and retaining and means closing the outer ends of said apertures and engageable with the ends of said aligned stud means and operable according to which end is engaged to render said retaining means effective to retain stud means in one of said aligned positions and ineffective to retain those in the other of said aligned positions whereby to deliver those in one of said aligned positions to a predetermined station.

5. In a mechanism for feeding dissimilarly ended elongated elements, a hopper, a rotary drum receiving elongated elements from said hopper, said rotary drum having a plurality of substantially radial apertures opening inwardly into said drum for receiving and aligning said elements radially of said drum, means fixed in the outer end of each of said apertures and cooperably interfitting with a predetermined end of each element to determine the radial positioning of said elements dependent upon which end of an element enters an aperture, and means associated with said rotary drum for retaining in said apertures only such of said elements as are in a predetermined radial position.

6. Means for feeding dissimilarly ended elongated elements as claimed in claim 5 in which the retaining means is movable with said drum and is provided with an element engaging portion to engage only elements having a distinguishing end feature in cooperative engagement with the radial positioning determining means.

7. Means for feeding dissimilarly ended elongated elements as claimed in claim 6 in which the retaining means comprises a plurality of members normally urged into engagement with said elements, and said mechanism further includes means for actuating said members in succession in the opposite direction to disengage said elements when said elements have been shifted by movement of said rotary drum.

8. In a mechanism for feeding dissimilarly ended elongated elements, a hopper, a rotary drum receiving dissimilarly ended elongated elements from said hopper, said rotary drum having a plurality of substantially radial apertures, means in said apertures engaging the ends of said elements, a plurality of members extending into said apertures and shifting with said rotary drum for retaining the elements when a predetermined one of the dissimilar ends is engaged, and means for retracting said retaining members successively to release the retained elements after movement thereof by rotation of said drum.

9. In a power driven driver of the type having a supporting column, a work table, and a rectilinearly shiftable driving member, means for feeding headless, dissimilarly ended elongated fastening elements having no enlarged end portion, comprising a hopper, means receiving said elements from said hopper for aligning headless fastening elements in oriented and in unoriented positions, means for engaging an end of said dissimilarly ended headless fastening elements, and means effective in cooperation with said end engaging means for retaining those of said fastening elements in one of said positions, means for positioning said headless fastening elements adjacent said work table, and delivery means for transferring oriented fastening elements from said receiving means to said positioning means.

10. Means for feeding headless, dissimilarly ended elongated fastening elements as claimed in claim 9 in which an escapement mechanism cooperates with the delivery means to deliver one fastening element at a time to the positioning means.

11. In a power driven driver of the type having a supporting column, a work table, and a rectilinearly shiftable driving member, means for feeding headless, dissimilarly ended elongated fastening elements comprising a hopper, means for receiving said headless fastening elements from said hopper and orienting said elements, means for delivering headless fastening elements from said orienting means to a location adjacent the path of motion of said driving member, and transversely shiftable means for accepting headless fastening elements from said delivery means, and means operable in timed relation with rectilinear shifting of said driving member to shift said shiftable means to position said headless fastening elements in the path of motion of said driving member.

12. Screw feeding means comprising a hopper including an end plate and a cover placed from said end plate, an open-ended rotary drum in said hopper, means for introducing a plurality of screws of the type having driving means at one end past said cover into said rotary drum, said drum defining a plurality of substantially radial apertures, said apertures being adapted to receive screws longitudinally disposed radially of said drum, means closing the outer peripheral ends of said apertures and cooperable with the driving means of said screws to position the screws longitudinally, and means carried by said drum engageable with screws in the apertures having their driving ends facing the outer periphery of said drum for retaining such screws.

13. In a power driven screw driver having a supporting column, a work table, a rotary power source, and a rectilinearly shiftable rotary screw driving member, means for feeding screws comprising a hopper, a rotary drum receiving headless screws from said hopper, means for driving said rotary drum from said rotary power source, means associated with said drum for orienting headless screws, means for positioning headless screws adjacent said work table and laterally spaced relative to the screw driving member from a work area on said table, means linking said positioning means and said rotary screw driving member to shift said positioning means laterally of the screw driving member toward said work area in response to rectilinear movement of said screw driving member, means for transferring oriented headless screws from said rotary drum to said positioning means, an escapement mechanism associated with said transferring means, and means including resilient means linking said escapement mechanism and said rotary screw driving member for operation of said escapement mechanism in response to rectilinear movement of said screw driving member.

14. In a power driven screw driver of the type having a supporting column, a work table, a rotary power source and a rectilinearly shiftable rotary screw driving member, means for feeding headless screws of the type having a driving socket, said headless screw feeding means comprising a hopper including an end plate and a cover spaced therefrom, an open ended rotary drum, means for driving said rotary drum from said rotary power source, said drum defining a plurality of substantially radial apertures adapted to receive screws longitudinally arranged substantially radially of said drum when tumbled into said apertures by rotation of said drum, pins extending radially inwardly in each of said apertures and engageable with the driving sockets of said screws, edged elements adjacent each of said apertures engageable with the threads of headless screws when the sockets of said screws cooperate with said pins, a cam carried by said end plate preventing engagement of said edged elements with screws when screws first enter said apertures, a second cam on said end plate removing each edged element from contact with a screw to release each screw as it reaches a predetermined position, means for receiving each of said screws as released and delivering each of said screws adjacent an axial projection of said rotary screw driving member, and means receiving headless screws one at a time from said delivery means and positively shifting said headless screws into axial alignment with said screw driving member in response to rectilinear movement of said rotary screw driving member.

15. Screw feeding means comprising a hopper including an end plate and a cover spaced therefrom, an open ended rotary drum for receiving screws from said hopper, said drum defining a plurality of substantially radial apertures adapted to receive screws of the type having a driving socket when longitudinally arranged substantially radially of said drum, pins extending radially inwardly in each of said apertures and engageable with the driving sockets of said screws, edged elements adjacent each of said apertures engageable with the threads of screws when the driving sockets of said screws cooperate with said pins, a cam carried by said end plate preventing engagement of said edged elements when screws first enter said apertures, and a second cam on said end plate removing each edged element from contact with a screw when the screw reaches a predetermined station.

16. Screw feeding means comprising a hopper, a rotary drum for receiving screws from said hopper, said drum defining a plurality of substantially radial apertures adapted to receive screws of the type having a driving socket when the screws are longitudinally arranged substantially radially of said drum, pins extending radially inwardly in each of said apertures and engageable with the driving sockets of said screws, means adjacent each of said apertures engageable with the threads of said screws when the driving sockets of said screws cooperate with said pins, means cooperable with the thread engaging means for preventing engagement thereof when screws first enter said apertures, and means for removing said thread engaging means from engagement with a screw when the screw reaches a predetermined station.

17. Apparatus for feeding dissimilarly ended stud means, comprising means for feeding such stud means successively and substantially transversely along a predetermined path, means in said feeding means interfitting with one end of each stud means and not with the other end for longitudinally positioning the stud means therein in one of two positions according to their end for end rotation, means on said feeding means for engaging and retaining the stud means in one of said two positions, and means fixed in position adjacent said path for engaging and positively releasing means for retaining the stud means at a predetermined location.

LEONARD EDMOND AUSTIN.

References Cited in the file of this patent

UNITED STATES PATENTS

| Number | Name | Date |
|---|---|---|
| 1,739,422 | Schmidt | Dec. 10, 1929 |
| 1,863,314 | Phelps et al. | June 14, 1932 |
| 1,958,248 | Runk | May 8, 1934 |
| 1,984,282 | Ray | Dec. 11, 1934 |
| 2,060,182 | Dellaree | Nov. 10, 1936 |
| 2,264,105 | White | Nov. 25, 1941 |
| 2,328,383 | Lea et al. | Aug. 31, 1943 |
| 2,433,096 | Davis | Dec. 23, 1947 |